(12) United States Patent
Goyal et al.

(10) Patent No.: US 11,769,245 B2
(45) Date of Patent: Sep. 26, 2023

(54) SYSTEMS AND METHODS OF MONITORING CARGO LOAD SYSTEMS FOR DAMAGE DETECTION

(71) Applicant: GOODRICH CORPORATION, Charlotte, NC (US)

(72) Inventors: Nitin Kumar Goyal, Bangalore (IN); Mahesh Ainapure, Bengaluru (IN); Ashutosh Kumar Jha, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/675,280

(22) Filed: Feb. 18, 2022

(65) Prior Publication Data
US 2023/0126817 A1    Apr. 27, 2023

(30) Foreign Application Priority Data
Oct. 21, 2021    (IN) .............................. 202141047974

(51) Int. Cl.
| | | |
|---|---|---|
| *G06T 7/00* | (2017.01) | |
| *H04N 7/18* | (2006.01) | |
| *B64F 5/60* | (2017.01) | |
| *G06V 10/764* | (2022.01) | |
| *B64D 9/00* | (2006.01) | |
| *G06V 10/82* | (2022.01) | |
| *H04N 23/66* | (2023.01) | |
| *H04N 23/69* | (2023.01) | |

(52) U.S. Cl.
CPC .............. *G06T 7/0004* (2013.01); *B64D 9/00* (2013.01); *B64F 5/60* (2017.01); *G06V 10/764* (2022.01); *G06V 10/82* (2022.01); *H04N 7/183* (2013.01); *H04N 23/66* (2023.01); *H04N 23/69* (2023.01); *G06T 2207/20084* (2013.01); *G06T 2207/30108* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 8,515,656 B2 | 8/2013 | Reed et al. | |
| 9,541,505 B2 | 1/2017 | Kesler et al. | |
| 10,789,789 B1 * | 9/2020 | Edman | G07C 5/085 |
| 10,839,506 B1 | 11/2020 | Raghu et al. | |
| 10,854,055 B1 * | 12/2020 | Cornell | G08B 3/1016 |
| 11,430,069 B1 * | 8/2022 | Pedersen | G06F 18/28 |

(Continued)

FOREIGN PATENT DOCUMENTS

| | | |
|---|---|---|
| CN | 205921701 | 2/2017 |
| WO | 2011014940 | 2/2011 |

*Primary Examiner* — Stefan Gadomski
(74) *Attorney, Agent, or Firm* — SNELL & WILMER L.L.P.

(57) ABSTRACT

A component inspection system for monitoring and detecting damage to components of a cargo handling system may comprise a first camera configured to monitor a first detection zone, and an inspection controller configured to analyze image data output by the first camera. The inspection system controller may be configured to identify a component of the cargo handling system in the image data received from the first camera and determine a state of the component. The state of the component may be at least one of a normal state or a damaged state.

11 Claims, 9 Drawing Sheets

(56) References Cited

U.S. PATENT DOCUMENTS

| | | | |
|---|---|---|---|
| 2005/0040224 A1* | 2/2005 | Brinton | G06Q 10/06 235/376 |
| 2010/0082151 A1* | 4/2010 | Young | G06Q 10/083 700/226 |
| 2010/0082152 A1* | 4/2010 | Mishra | G06Q 10/08 700/226 |
| 2010/0235037 A1 | 9/2010 | Vian et al. | |
| 2015/0254600 A1* | 9/2015 | Murthy | G06Q 10/083 705/337 |
| 2016/0050356 A1* | 2/2016 | Nalepka | H04N 23/62 348/148 |
| 2017/0313269 A1* | 11/2017 | Breed | B60R 21/01526 |
| 2017/0349166 A1* | 12/2017 | Anderson | B60W 30/02 |
| 2017/0351268 A1* | 12/2017 | Anderson | H04W 4/44 |
| 2018/0089622 A1* | 3/2018 | Burch, V | G05D 1/0094 |
| 2018/0336672 A1* | 11/2018 | Perticone | G06V 20/00 |
| 2018/0352198 A1* | 12/2018 | Raasch | G06V 10/22 |
| 2019/0102874 A1* | 4/2019 | Goja | G06F 18/2431 |
| 2019/0114714 A1* | 4/2019 | Jones | H04W 4/026 |
| 2019/0130351 A1* | 5/2019 | Arena | G06Q 10/0833 |
| 2019/0213498 A1* | 7/2019 | Adjaoute | G06Q 20/405 |
| 2019/0256227 A1 | 8/2019 | Balasubramanian et al. | |
| 2019/0265714 A1* | 8/2019 | Ball | G05D 1/0221 |
| 2020/0051017 A1* | 2/2020 | Dujmic | G06F 18/214 |
| 2020/0137360 A1* | 4/2020 | Somers | G08B 13/19647 |
| 2020/0193196 A1* | 6/2020 | Saydag | G06V 10/776 |
| 2020/0218288 A1* | 7/2020 | Johnson | G05D 1/0022 |
| 2020/0324919 A1 | 10/2020 | Drayton | |
| 2020/0349498 A1* | 11/2020 | Brooks | G06F 18/21 |
| 2020/0361607 A1 | 11/2020 | Kovacs, II | |
| 2021/0073553 A1 | 3/2021 | Halliday et al. | |
| 2021/0192428 A1* | 6/2021 | Heikkilä | G06Q 10/0832 |
| 2021/0201137 A1* | 7/2021 | Norton | G01V 5/0016 |
| 2021/0319543 A1* | 10/2021 | Young | G06Q 50/28 |
| 2022/0114298 A1* | 4/2022 | Palmer | G01P 13/00 |
| 2022/0156682 A1* | 5/2022 | Rai | G06Q 10/0838 |
| 2022/0342927 A1* | 10/2022 | Marfoq | G06V 10/82 |

* cited by examiner

SYSTEMS AND METHODS OF MONITORING CARGO LOAD SYSTEMS FOR DAMAGE DETECTION

CROSS-REFERENCE TO RELATED APPLICATIONS

This application claims priority to, and the benefit of, India Patent Application No. 202141047974, filed Oct. 21, 2021 and titled "SYSTEMS AND METHODS OF MONITORING CARGO LOAD SYSTEMS FOR DAMAGE DETECTION," which is incorporated by reference herein in its entirety for all purposes.

FIELD

The present disclosure relates generally to cargo handling systems and, more particularly, to methods, apparatus, and systems used to determine and communicate information concerning the status and/or health of components of an aircraft cargo handling system.

BACKGROUND

Cargo handling systems for aircraft typically include various tracks and conveyance rollers disposed on a cargo deck that spans the length of a cargo compartment. Cargo may be loaded from an entrance of the aircraft and transported by the cargo handling system to forward or aft locations, depending upon the configuration of the aircraft. Cargo handling systems typically include roller trays containing transport rollers that support and transport the cargo. Motor driven rollers are typically employed in such systems. In certain aircraft, motor driven power drive units (PDUs) are used to propel the cargo within the cargo compartment. This configuration facilitates transportation of the cargo within the cargo compartment by one or more operators or agent-based systems controlling operation of the PDUs.

Currently, maintenance personnel visually inspect the components of the cargo handling systems for damage, degradation, and/or deformation. Manual inspection, in addition to being time consuming, is prone to human error and/or inconsistency due to subjective decision making. Not detecting a damaged component can lead to customer dissatisfaction, damage to cargo (e.g., luggage, unit load devices, pallets, etc.), cargo handling system failure, unscheduled maintenance, increased repair times, and/or lost revenue.

SUMMARY

A component inspection system for monitoring and detecting damage to components of a cargo handling system is disclosed herein. In accordance with various embodiments, the component inspection system may comprise a first camera configured to monitor a first detection zone, and an inspection system controller configured to analyze image data output by the first camera. The inspection system controller may be configured to identify a component of the cargo handling system in the image data received from the first camera and determine a state of the component. The state of the component may be at least one of a normal state or a damaged state.

In various embodiments, a network gateway may be configured to receive the image data output by the first camera and output a signal corresponding to the image data to the inspection system controller.

In various embodiments, the inspection system controller is configured to input the image data into a trained component identification model to identify the component of the cargo handling system.

In various embodiments, the inspection system controller is configured to select a trained damage classification model based on the identified component. The inspection system controller may be configured to input the image data into the trained damage classification model to determine the state of the component.

In various embodiments, at least one of the trained component identification model and the trained damage classification model comprises a convolutional neural network.

In various embodiments, a portable electronic device is in operable communication with the first camera and the inspection system controller.

In various embodiments, the portable electronic device is configured to send a camera command to the first camera based on a command received from the inspection system controller. In various embodiments, the inspection system controller is configured to command the portable electronic device to display a report configured to convey at least one of a component identity and a component location for any component of the cargo handling system determined to be in the damaged state.

A method for inspecting components of a cargo handling system is also disclosed herein. In accordance with various embodiments, the method may comprise the steps of receiving, by an inspection system controller, a begin component inspection operation command; receiving, by the inspection system controller, image data from a camera configured to capture images of a detection zone; identifying, by the inspection system controller, a component of the cargo handling system in the image data; and determining, by the inspection system controller, a state of the component, wherein the state of the component comprises at least one of a normal state or a damaged state.

In various embodiments, identifying, by the inspection system controller, the component of the cargo handling system in the image data may comprise the steps of inputting, by the inspection system controller, the image data into a trained component identification model; and receiving, by the inspection system controller, a component identification output by the trained component identification model.

In various embodiments, determining, by the inspection system controller, the state of the component may comprise the steps of selecting, by the inspection system controller, a trained damage classification model based on the component identification output by the trained component identification model; inputting, by the inspection system controller, the image data into the trained damage classification model; and receiving, by the inspection system controller, a damage classification output by the trained damage classification model. The damage classification may correspond to the state of the component.

In various embodiments, the method may further comprise determining, by the inspection system controller, a confidence score of the damage classification; and comparing, by the inspection system controller, the confidence score to a threshold confidence.

In various embodiments, the method may further comprise commanding, by the inspection system controller, the camera to at least one of rotate, zoom-in, or zoom-out in response to determining the confidence score to is less than the threshold confidence.

In various embodiments, the method may further comprise commanding, by the inspection system controller, a portable electronic device to display the state of the component.

In various embodiments, the method may further comprise commanding, by the inspection system controller, the portable electronic device to display the image data output by the camera.

In various embodiments, the method may further comprise commanding, by the inspection system controller, a portable electronic device to display an interactive guidance configured to allow at least one of the camera or the component to be controlled using the portable electronic device.

An article of manufacture including a tangible, non-transitory computer-readable storage medium having instructions stored thereon for performing a cargo handling system component inspection operation is also disclosed herein. In accordance with various embodiments, the instructions, in response to execution by an inspection system controller, cause the inspection system controller to perform operations, which may comprise receiving, by the inspection system controller, a begin component inspection operation command; receiving, by the inspection system controller, image data from a camera configured to capture images of a cargo handling system; identifying, by the inspection system controller, a component of the cargo handling system in the image data; and determining, by the inspection system controller, a state of the component. The state of the component may be at least one of a normal state or a damaged state.

In various embodiments, identifying, by the inspection system controller, the component of the cargo handling system in the image data comprises inputting, by the inspection system controller, the image data into a trained component identification model; and receiving, by the inspection system controller, a component identification output by the trained component identification model.

In various embodiments, determining, by the inspection system controller, the state of the component comprises selecting, by the inspection system controller, a trained damage classification model based on the component identification output by the trained component identification model; inputting, by the inspection system controller, the image data into the trained damage classification model; and receiving, by the inspection system controller, a damage classification output by the trained damage classification model. The damage classification may correspond to the state of the component.

In various embodiments, the operations may further comprise sending, by the inspection system controller, instructions to a portable electronic device configured to cause the portable electronic device to command the camera to at least one of zoom-in or zoom-out and capture image data of a damaged portion of the component.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
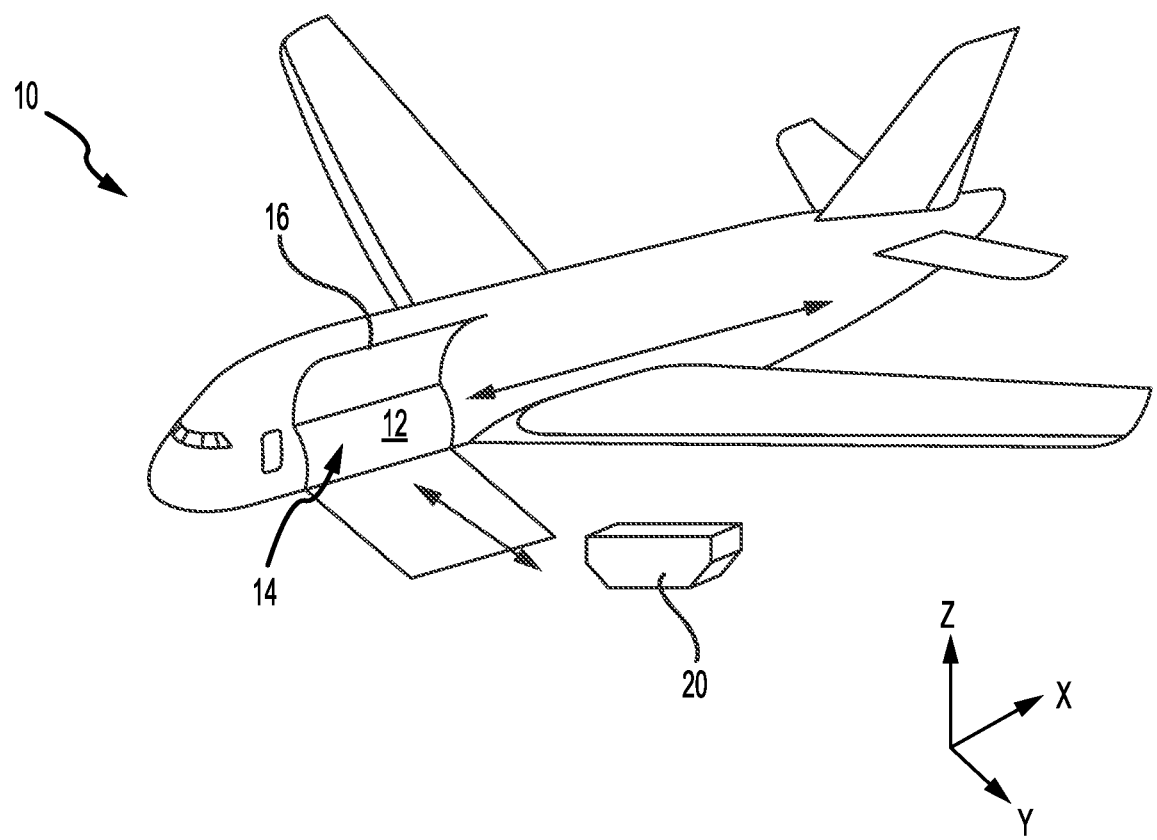
FIG. 1A illustrates an aircraft being loaded with cargo, in accordance with various embodiments.

With reference to FIG. 1A, an aircraft 10 having a cargo deck 12 located within a cargo compartment 14 of the aircraft 10 is illustrated, in accordance with various embodiments. The aircraft 10 may comprise a cargo load door 16 located, for example, at one side of a fuselage structure of the aircraft 10. Cargo 20, in the form of a unit load device (ULD), luggage, a container, a pallet, etc., may be loaded through the cargo load door 16 and onto the cargo deck 12 of the aircraft 10 or, conversely, unloaded from the cargo deck 12 of the aircraft 10. Once inside the aircraft 10, cargo 20 is moved within the cargo compartment 14 to a final stowed position. Multiple pieces of cargo may be brought on-board the aircraft 10, with each piece being placed in a respective stowed position on the cargo deck 12. After the aircraft 10 has reached its destination, cargo 20 is unloaded from the aircraft 10 in similar fashion, but in reverse sequence to the loading procedure. To facilitate movement of the cargo 20 along the cargo deck 12, the aircraft 10 may include a cargo handling system, as described herein in accordance with various embodiments.

Figure 1B:
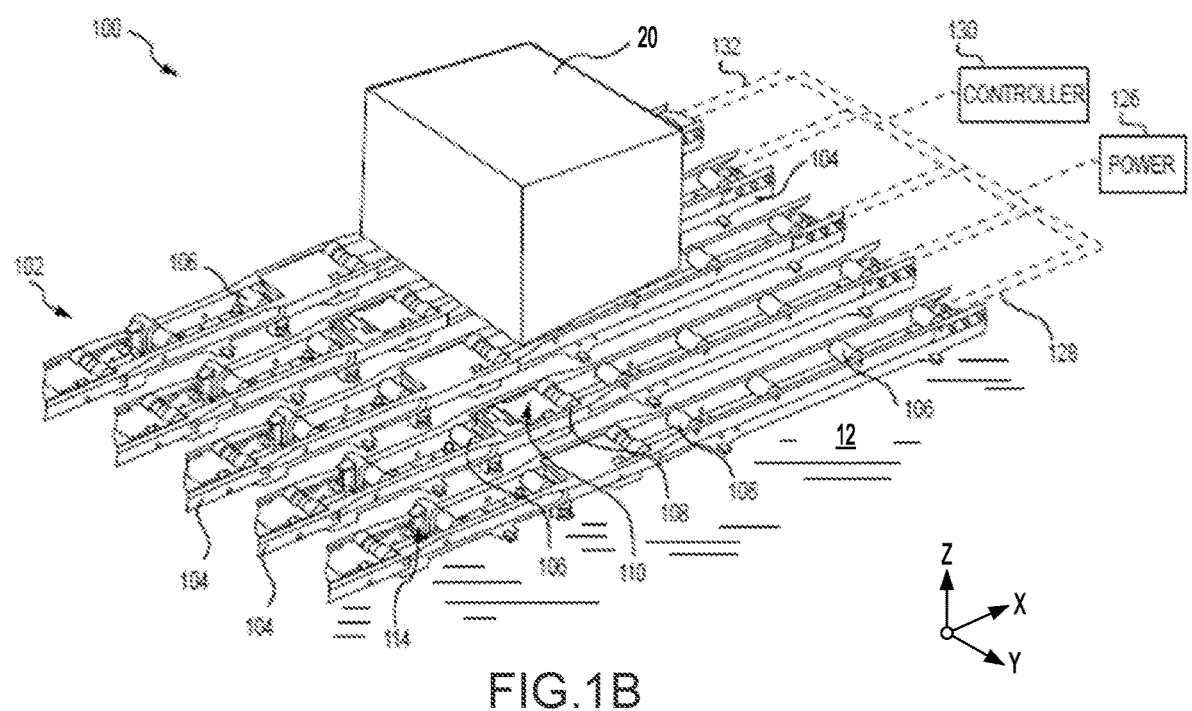
FIG. 1B illustrates a portion of a cargo deck and a cargo handling system, in accordance with various embodiments.

Referring now to FIG. 1B, a portion of a cargo handling system 100 is illustrated, in accordance with various embodiments. The cargo handling system 100 is illustrated with reference to an XYZ coordinate system, with the X-direction extending longitudinally aft and the Z-direction extending vertically with respect to an aircraft in which the cargo handling system 100 is positioned, such as, for example, the aircraft 10 described above with reference to FIG. 1A. In various embodiments, the cargo handling system 100 includes a plurality of trays 104 supported by cargo deck 12. The plurality of trays 104 may be configured to support the cargo 20. In various embodiments, the cargo 20 may be a ULD. In various embodiments, the plurality of trays 104 is disposed throughout the cargo deck 12 and may support a plurality of conveyance rollers 106, where one or more or all of the plurality of conveyance rollers 106 is a passive roller—e.g., a non-motorized roller. In various embodiments, the plurality of conveyance rollers 106 define a conveyance plane 102 across the cargo deck 12. Conveyance plane 102 is a generally flat plane, which is parallel to the XY plane.

In various embodiments, the cargo handling system 100 includes a plurality of power drive units (PDUs) 110, each of which may include one or more drive rollers 108 that may be actively powered by a motor. In various embodiments, one or more of the plurality of trays 104 is positioned longitudinally along the cargo deck 12—e.g., along the X-direction extending from the forward end to the aft end of the aircraft. In various embodiments, the plurality of conveyance rollers 106 and the one or more drive rollers 108 may be configured to facilitate transport of the cargo 20 in the forward and the aft directions along the conveyance plane 102. Similarly, one or more of the plurality of trays 104 may be positioned laterally along the cargo deck 12—e.g., along the Y-direction extending from a starboard-side to a port-side of the aircraft—and the plurality of conveyance rollers 106 and the one or more drive rollers 108 may be configured to facilitate transport of the ULD 20 in the starboard and port directions along the conveyance plane 102. During loading and unloading, the cargo 20 may variously contact the one or more drive rollers 108 to provide a motive force for transporting the cargo 20 along the conveyance plane 102. Each of the plurality of PDUs 110 may include an actuator, such as, for example, an electrically operated motor, configured to drive the one or more drive rollers 108 corresponding with each such PDU 110. In various embodiments, the one or more drive rollers 108 may be raised from a lowered position beneath the conveyance plane 102 to an elevated position above the conveyance plane 102 by the corresponding PDU 110. As used with respect to cargo handling system 100, the term "beneath" may refer to the negative Z-direction, and the term "above" may refer to the positive Z-direction with respect to the conveyance plane 102. In the elevated position, the one or more drive rollers 108 variously contact and drive the cargo 20, thereby causing the cargo 20 to ride on the plurality of conveyance rollers 106. Other types of PDUs, which may also be used in various embodiments of the present disclosure, include a drive roller that is held or biased in a position above the conveyance plane 102 by a spring. Without loss of generality, the PDUs as described herein may comprise any type of electrically powered rollers that may be selectively energized to propel or drive the cargo 20 in a desired direction over the cargo deck 12 of the aircraft 10. The plurality of trays 104 may further support a plurality of restraints 114. In various embodiments, each of the plurality of restraints 114 may be configured to rotate downward to a stowed position as the cargo 20 passes over and along the conveyance plane 102. Once the cargo 20 passes over any such one of the plurality of restraints 114, such restraint device returns to its upright (or raised) position, either by a motor driven actuator or a biasing member, thereby restraining or preventing the cargo 20 from translating in the opposite direction.

In various embodiments, the cargo handling system 100 may include a system controller 130 in communication with each of the plurality of PDUs 110 via a plurality of channels 132. Each of the plurality of channels 132 may be a data bus, such as, for example, a controller area network (CAN) bus. An operator may selectively control operation of the plurality of PDUs 110 using the system controller 130. In various embodiments, the system controller 130 may be configured to selectively activate or deactivate the plurality of PDUs 110. Thus, the cargo handling system 100 may receive operator input through the system controller 130 to control the plurality of PDUs 110 in order to manipulate movement of the cargo 20 over the conveyance plane 102 and into a desired position on the cargo deck 12. In various embodiments, the system controller 130 may include a general purpose processor, a digital signal processor (DSP), an application specific integrated circuit (ASIC), a field programmable gate array (FPGA) or some other programmable logic device, discrete gate or transistor logic, discrete hardware components, or any combination thereof. The cargo handling system 100 may also include a power source 126 configured to supply power to the plurality of PDUs 110 and/or to the plurality of restraints 114 via one or more power buses 128.

Figure 2:
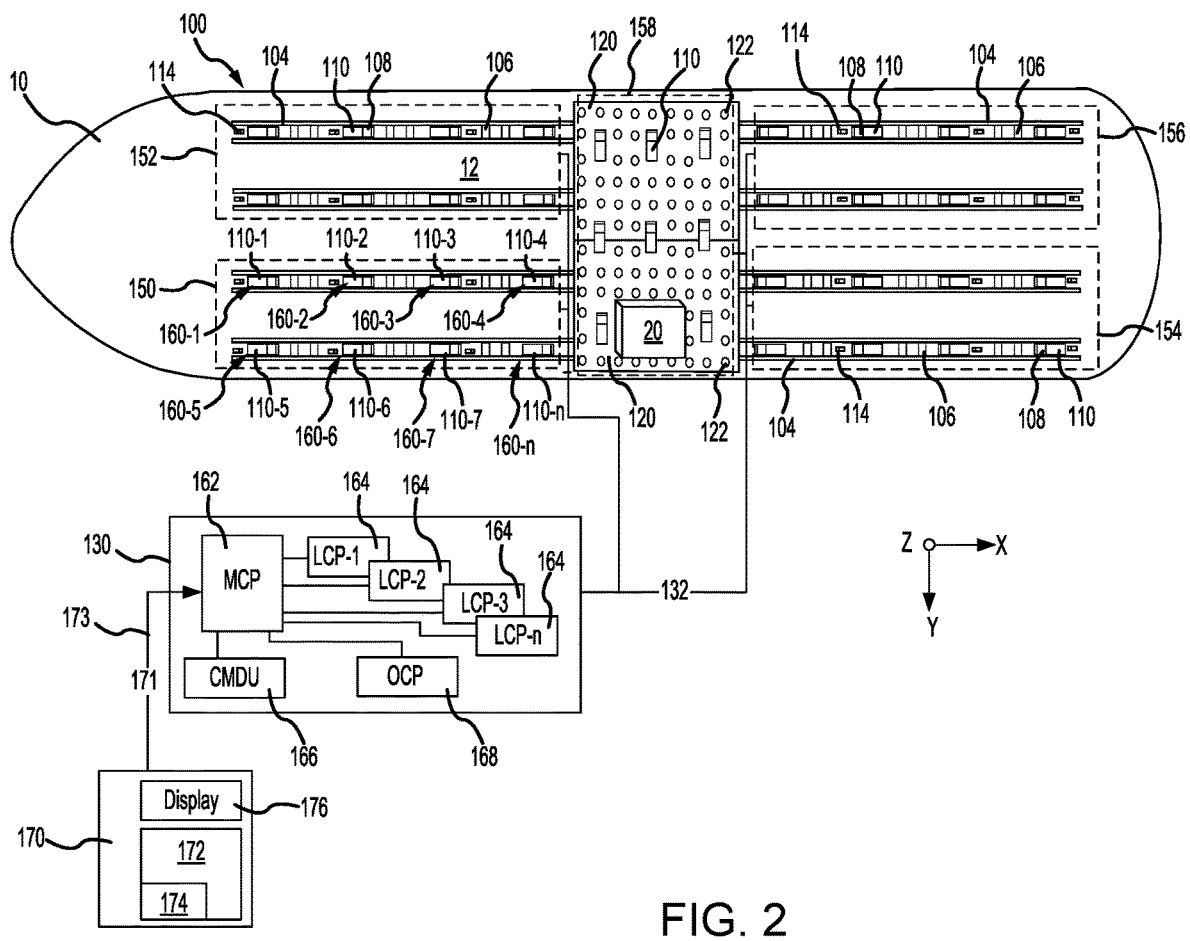
FIG. 2 illustrates a top view of a cargo handling system, in accordance with various embodiments.

Referring now to FIG. 2, a schematic view of the cargo handling system 100 positioned on the cargo deck 12 of the aircraft 10 is illustrated, in accordance with various embodiments. The PDUs 110 may be generally arranged in a matrix configuration about the cargo deck 12. Associated with each of the plurality of PDUs 110 may be one or more drive rollers 108, as described above with reference to FIG. 1B. Each of the one or more drive rollers 108 is generally configured to selectively protrude from the conveyance plane 102 in order to engage with a surface of the cargo 20 as it is guided across the cargo deck 12 during loading and unloading operations. Conveyance rollers 106 may be arranged among the plurality of PDUs 110 in a matrix configuration as well. Cargo handling system 100 may also include roller ball units (or mats) 120 having roller balls 122—e.g., spherical rollers—located therein. In various embodiments, one or more of the PDUs 110 may be located in roller ball units 120.

In various embodiments, the cargo handling system 100 or, more particularly, the cargo deck 12, is divided into a plurality of sections. As illustrated, for example, the cargo deck 12 may include a port-side section and a starboard-side section along which a plurality of pieces cargo may be stowed in parallel columns during flight. Further, the cargo deck 12 may be divided into an aft section and a forward section. Thus, the cargo deck 12, in various embodiments and as illustrated, may be divided into four sections—e.g., a forward port-side section 150, a forward starboard-side section 152, an aft port-side section 154, and an aft starboard-side section 156. The cargo deck 12 may also have a lateral section 158, which may be used to transport the cargo 20 onto and off the cargo deck 12 as well as transfer the cargo 20 between the port-side and starboard-side sections and between the aft and forward sections. The cargo deck configurations described above and illustrated in FIG. 2 are exemplary only and may be varied depending on, for example, the aircraft parameters. In various embodiments, for example, configurations having fewer than four sections or more than four sections may be employed.

Each of the aforementioned sections—i.e., the forward port-side section 150, the forward starboard-side section 152, the aft port-side section 154, and the aft starboard-side section 156—may include one or more of the plurality of PDUs 110. Each one of the plurality of PDUs 110 has a physical location on the cargo deck 12 that corresponds to a logical address within the cargo handling system 100. For purposes of illustration, the forward port-side section 150 is shown having a first PDU 110-1, a second PDU 110-2, a third PDU 110-3, a fourth PDU 110-4, a fifth PDU 110-5, a sixth PDU 110-6, a seventh PDU 110-7, and an Nth PDU 110-n. The aforementioned individual PDUs are located, respectively, at a first location 160-1, a second location 160-2, a third location 160-3, a fourth location 160-4, a fifth location 160-5, a sixth location 160-6, a seventh location 160-7, and an Nth location 160-n. In various embodiments, each of the aforementioned individual PDUs 110 on the cargo deck 12 may have a unique location (or address) identifier.

In various embodiments, an operator may control operation of the plurality of PDUs 110 using one or more control interfaces of system controller 130. For example, an operator may selectively control the operation of the plurality of PDUs 110 through an interface, such as, for example, a master control panel (MCP) 162.

In various embodiments, the cargo handling system 100 may also include one or more local control panels (LCPs) 164. In various embodiments, the MCP 162 may be in operable communication, via wired or wireless connection, with the LCPs 164. The MCP 162 and/or the LCPs 164 may be configured to control the PDUs 110. For example, an operator may use MCP 162 and/or LCPs 164 to send command signals, via wired or wireless connection, to PDUs 110 to control the movement of the cargo 20 over cargo deck 12. In this regard, MCP 162 and/or LCPs 164 may communicate with each of the plurality of PDUs 110 or to a subset of the plurality of PDUs 110, such as, for example, the aforementioned individual PDUs described above with reference to the forward port-side section 150. For example, a first local control panel LCP-1 may be configured to communicate with the PDUs 110 residing in the forward port-side section 150, a second local control panel LCP-2 may be configured to communicate with the PDUs 110 residing in the forward starboard-side section 152, a third local control panel LCP-3 may be configured to communicate with the PDUs 110 residing in aft port-side section 154, and one or more additional local control panels LCP-n may be in communication with the PDUs 110 in one or more of the aft starboard-side section 156 and/or the lateral section 158. Thus, the MCP 162 and the LCPs 164 may be configured to allow an operator to selectively engage or activate one or more of the plurality of PDUs 110 to propel the cargo 20 along the conveyance plane 102. Commands may be sent over channels 132, which provide a communication link between the system controller 130—e.g., the MCP 162 and the LCPs 164—and the PDUs 110. In various embodiments, a command signal sent from the system controller 130 may include one or more logical addresses, each of which may correspond to a physical location of one of the plurality of PDUs 110. Each of the plurality of PDUs 110 that receives the command signal may determine if the command signal is intended for that particular PDU by comparing its own address to the address included in the command signal. In various embodiments, restraints 114 may be selectively controlled—e.g., actuated between the raised position and the stowed position—in a similar manner using the MCP 162 and/or LCPs 164.

In various embodiments, MCP 162 may be in operable communication, via wired or wireless connection, with a cargo maintenance display unit (CMDU) 166 and an outside control panel (OCP) 168. The CMDU 166 may be configured to track and display the health or operating condition of various components—e.g. PDUs 110, restraints 114, trays 104, rollers 106, etc.—of cargo handling system 100. The OCP 168 may provide an interface or means for controlling cargo handling system 100 remotely, for example, from the cockpit of aircraft 10, from a main cargo handling office, or any other location from which cargo deck 12 may not be readily in view.

In accordance with various embodiments, cargo handling system 100 may further include a portable electronic device (PED) 170. PED 170 may be a tablet, a cellular phone, a laptop computer, or any other apparatus capable of interfacing with system controller 130. PED 170 may be computer based, and may comprise a PED controller 172, a tangible, non-transitory computer-readable storage medium 174, a user interface 176 (also referred to herein as a PED display), along with other suitable system software and hardware components. PED controller 172 may include one or more logic devices such as one or more of a central processing unit (CPU), an accelerated processing unit (APU), a DSP, a FPGA, an ASIC, or the like—e.g., PED controller 172 may utilize one or more processors of any appropriate type/configuration, may utilize any appropriate processing architecture, or both. Storage medium 174 may be in communication with PED controller 172. The storage medium 174 may comprise any tangible, non-transitory computer-readable storage medium known in the art. The storage medium 174 has instructions stored thereon that, in response to execution by PED controller 172, cause PED controller 172 to perform operations related to controlling cargo handling system 100. PED 170 may comprise an operating system, such as, for example, a WINDOWS® mobile operating system, an ANDROID® operating system, APPLE® IOS®, a BLACKBERRY® operating system, and the like.

PED 170 may control components of cargo handling system 100 by sending commands 171 to system controller 130—e.g., to MCP 162 and/or LCPs 164. PED 170 may send commands 171 to system controller 130 via one or more channel(s) 173. Channel(s) 173 provide(s) a communication link (wired or wireless) between system controller 130 and PED 170.

As described in further detail below, PED 170 may also be employed during a component inspection operation. In this regard, storage medium 174 may also have instructions stored thereon that, in response to execution by PED controller 172, cause PED controller 172 to perform operations related to communicating with a component inspection system as described below. PED 170 may control components of cargo handling system 100 and/or the components inspection system during a component inspection operation. PED 170 may also display results of the component inspection operation to an operator of PED 170.

Figure 3A:
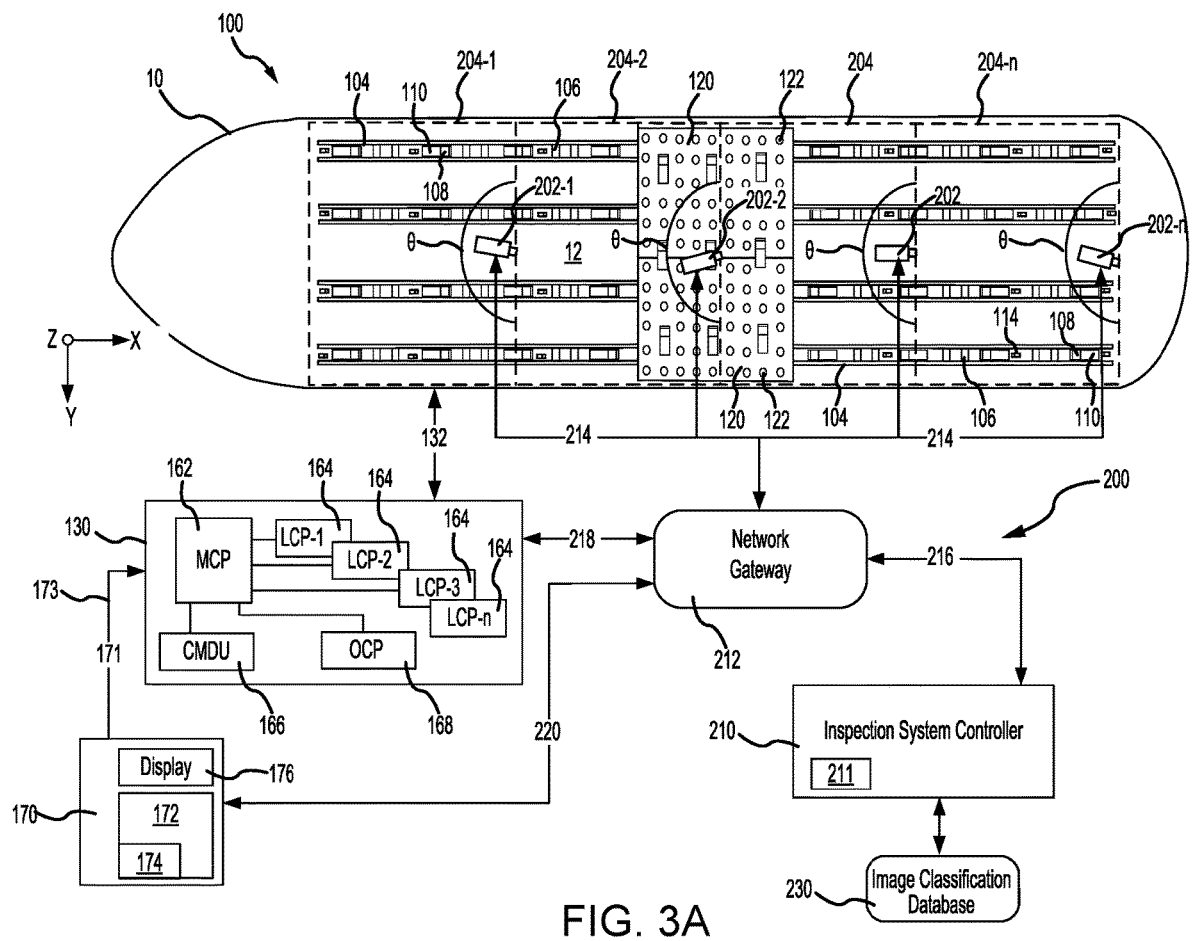
FIGS. 3A and 3B illustrates a component inspection system for monitoring a health of components of the cargo handling system of FIG. 2, in accordance with various embodiments.

With reference to FIG. 3A, in accordance with various embodiments, cargo handling system 100 may include a component inspection system 200 for monitoring and detecting damage to components of cargo handling system 100. System 200 comprises a plurality of cameras 202—e.g., a first camera 202-1, a second camera 202-2 . . . and an Nth camera 202-n). Cameras 202 are each configured to monitor a detection zone 204. For example, first camera 202-1 captures images within a first detection zone 204-1, second camera 202-2 captures images within a second detection zone 204-2, Nth camera 202-n captures images of an Nth detection zone 204-n. Stated differently, each camera 202 captures images any cargo handling system components— e.g., PDUs 110, trays 104, rollers 106, etc.—within the detection zone 204 of the camera 202.

In various embodiments, detection zones 204 may overlap, such that a component of cargo handling system 100 may be captured by more than one camera 202. While cameras 202 are illustrated as oriented (or facing) in a forward direction, it is further contemplated and understood that other camera orientations are possible. For example, in various embodiments, one or more camera(s) 202 may face in an aft direction, may face a port-side wall of aircraft 10 and/or may face a starboard-side wall of aircraft 10.

Cameras 202 may comprise any suitable apparatus, hardware, or software capable of monitoring their respective detection zone 204. In various embodiments, each camera 202 may be a video camera, for example, a high definition video camera. In various embodiments, one or more of the cameras 202 may capture still images. In addition to cameras 202, system 200 may also comprise, for example, one or more of a structured light sensor, a light detection and ranging (LiDAR) sensor, an infrared sensor, a depth sensor (e.g., a MICROSOFT® Kinect®, a MYNT® Eye, or an ASUS® Xtion PRO), a three-dimensional scanner, an ultrasound range finder, a radar sensor, or any other suitable sensing device. In various embodiments, cameras 202 have a 180° field of view. In various embodiments, cameras 202 may be rotated—e.g., may include an actuator configured to rotate the camera 202—to cover a 180° field of view. Stated differently, each camera 202 is configured to capture images within an angle θ of approximately 180°—e.g., the field of view of each camera 202 may span 180° from a port-side wall to a starboard-side wall of the aircraft 10. As used in the previous context only, "approximately" means ±15°.

In accordance with various embodiments, cameras 202 are operably coupled to an inspection system controller 210 of system 200. Inspection system controller 210 is configured to analyze images captured by cameras 202, identify components of cargo handling system 100 in the images captured by cameras 202, determine whether the identified component(s) is/are damaged or degraded, and/or detect other anomalies—e.g., debris, foreign objects, and/or obstructions—which may affect cargo handling system 100.

In various embodiments, cameras 202 are connected to inspection system controller 210 via a network gateway 212. Network gateway 212 may send signals to and receive signals from cameras 202 via channels 214. Channels 214 provide a communication link between cameras 202 and network gateway 212. Network gateway 212 is configured to send signals to and receive signals from inspection system controller 210 via channels 216. Channels 216 provide a communication link between network gateway 212 and inspection system controller 210.

Inspection system controller 210 is also connected to system controller 130 and PED 170 via network gateway 212. Signals may be sent between network gateway 212 and system controller 130 via channels 218 and between network gateway 212 and PED 170 via channels 220. Channels 218 provide a communication link between network gateway 212 and system controller 130—e.g., between network gateway 212 and the MCP 162 and/or between network gateway 212 and the LCPs 164. Channels 220 provide a communication link between network gateway 212 and PED 170. As described in further detail below, network gateway 212 may send signals corresponding to the signals received from cameras 202, PED 170, and/or system controller 130 to inspection system controller 210 via channels 216; network gateway 212 may also send signals corresponding to signals received from inspection system controller 210 to cameras 202, PED 170, and/or system controller 130.

Inspection system controller 210 may be configured as a central network element or hub to access various systems and/or components of cargo handling system 100 and system 200. Inspection system controller 210 may comprise a network, computer-based system, and/or software components configured to provide an access point to various systems and components of cargo handling system 100 and system 200. Inspection system controller 210 may be in operative and/or electronic communication with PED 170, system controller 130—e.g., the MCP 162 and the LCPs 164—and cameras 202 via network gateway 212. Inspection system controller 210 is further configured to communicate with and/or access an image classification database 230. In various embodiments, inspection system controller 210 is a distributed application with parts of the application in PED 170 (e.g., in PED controller 172 and/or in storage medium 174) communicating with cameras 202 via channels 220 and other parts of the distributed application via channels 216.

Inspection system controller 210 may comprise any suitable combination of hardware, software, and/or database components. For example, inspection system controller 210 may comprise one or more network environments, servers, computer-based systems, processors, databases, and/or the like. Inspection system controller 210 may comprise at least one computing device in the form of a computer or processor, or a set of computers/processors, although other types of computing units or systems may be used, such as, for example, a server, web server, pooled servers, or the like. Inspection system controller 210 may also include one or more data centers, cloud storages, or the like, and may include software, such as APIs, SDKs, etc. configured to retrieve and write data to image classification database 230, PED 170, and/or system controller 130. In various embodiments, inspection system controller 210 may include one or more processors and/or one or more tangible, non-transitory memories and be capable of implementing logic. The processor may be configured to implement various logical operations in response to execution of instructions. For example, instructions may be stored on a non-transitory, tangible, computer-readable storage medium 211 and may, in response to execution by inspection system controller 210, cause inspection system controller 210 to perform operations related to performing a component inspection operation of cargo handling system 100.

In various embodiments, inspection system controller 210 may be a cloud-based high performance computing network. In this regard, inspection system controller 210 may include a high performance computing cluster configured to utilize parallel computing. Stated differently, inspection system controller 210 may be a plurality of high performance computing resources arranged in a distributed array for parallel computing—e.g., inspection system controller 210 may comprise a plurality of compute nodes arranged in an array and configured for parallel processing of massive amounts of data. It will be appreciated that inspection system controller 210 may utilize one or more processors of any appropriate type/configuration and/or any appropriate processing architecture.

In accordance with various embodiments, the image classification database 230 comprises a suitable data structure, such as, for example, a database (including a relational, hierarchical, graphical, blockchain, or object-oriented structure or any other database configuration) or a flat file structure. The image classification database 230 may be configured to store and maintain data relating to the cargo handling system 100. For example, the image classification database 230 may store and maintain models comprising data of known object properties for various components of the cargo handling system 100. The image classification database 230 may also store image data received from cameras 202 during previous component inspection operations and/or cargo deck models generated from image data received from cameras 202 during previous component inspection operations. The image classification database 230 may store any other suitable data related to the cargo handling system 100, such as, for example, a health status of one or more components of the cargo handling system 100 (e.g., information concerning location and damage status of components of the cargo handling system), the location of each known cargo handling system component, information concerning the cargo deck 12 (e.g., the position of one or more of a plurality of PDUs 110 and/or restraints 114), or any other suitable data corresponding to cargo handling system 100.

In various embodiments, image classification database 230 is created including various images of different cargo handling system components—e.g., trays, rollers, PDUs, drive roller, restraints, guides, panels, roller ball units, roller balls, etc.—and/or of cargo handling system components having different damage conditions—e.g., normal, damaged, deteriorated, etc.—and each of these images is categorized, assigned, or labeled with a component identification and a damage classification. Image processing may be used to identify the most prominent features in each of the images and that assessed for the subsequent damage classification. This may entail using a feature extraction algorithm. A support vector machine (SVM), a convolutional neural network (CNN), or a recurrent neural network (RNN) that uses supervised learning may be created to categorize/classify images. That is, the image classification database 230 may be created and trained. After training, an image may be captured by one or more cameras 202 during a component inspection operation performed by inspection system controller 210. The image classification database 230 is then accessed by inspection system controller 210 to categorize the captured image using image processing to identify a cargo system component in the image and categorize a state of the identified component.

Figure 3B:
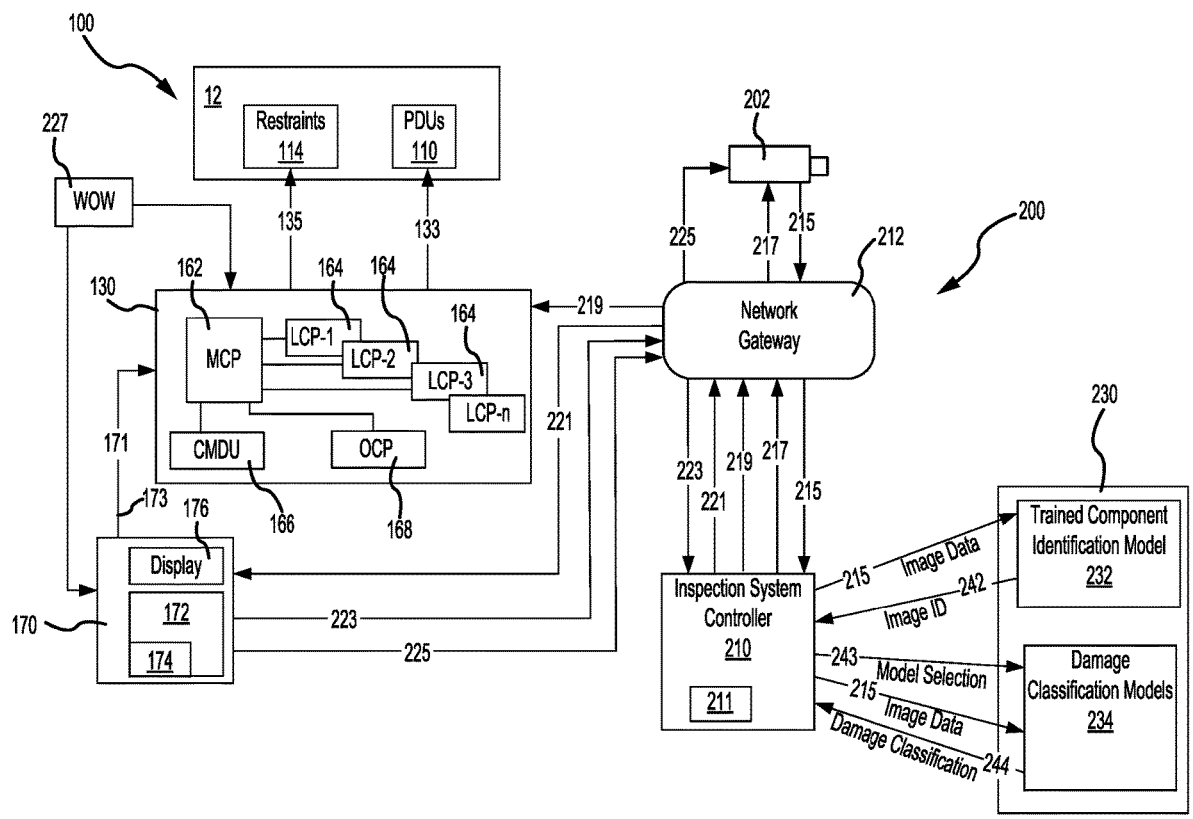

With reference to FIG. 3B, additional details of system 200 are illustrated. In accordance with various embodiments, cameras 202 output image signals 215 (also referred to as image data) corresponding to the images captured by cameras 202. Cameras 202 send the image data 215 to network gateway 212. Network gateway 212 sends the image data 215 to inspection system controller 210. Stated differently, inspection system controller 210 receives the image data 215 output by cameras 202. Image data 215 may be in the form of a still photo or in the form of a video stream. Inspection system controller 210 may send camera commands 217 to cameras 202. Camera commands 217 may include an "on" command configured to cause cameras 202 to begin capturing images of their respective detection zones 204 (FIG. 3A). Inspection system controller 210 may send the "on" command in response to initiation of a component inspection operation. Camera commands 217 may also include actuation commands configured to cause cameras 202 to rotate, zoom-in, zoom-out, etc. For example, inspection system controller 210 may be configured to send a zoom-in command to a camera 202 if damage or another anomaly is detected in the camera's detection zone. A zoomed-in view of a possibly damaged component may provide additional image data for the damage and/or anomaly determinations, thereby increasing an accuracy of the determinations made by system 200.

In accordance with various embodiments, inspection system controller 210 may send component commands 219 to system controller 130 via network gateway 212. For example, during a component inspection operation, inspection system controller 210 may send one or more component commands 219 to system controller 130. Component commands 219 are configured to cause actuation of one or more components of cargo handling system 100. In response to receiving a component command 219, system controller 130 may send an actuation command 133 to one or more of the PDUs 110 and/or an actuation command 135 to one or more of the restraints 114. Actuation command 133 may be configured to cause the PDUs 110 to translate between the elevated position and the lowered position. Actuation command 133 may also be configured to cause the drive roller 108 (FIG. 2) of the PDU receiving the actuation command 133 to rotate, thereby allowing camera 202 to capture 360° of the drive roller surface. In various embodiments, component command 219 may configured to increase or decrease a rotation speed (Rotations Per Minute (RPM)) of drive roller 208 to increase a quality of the image captured by camera 202 and/or to increase an accuracy of the damage classification. Actuation command 135 may be configured to cause one or more of the restraints 114 to translate between a raised position and a stowed position.

In various embodiments, inspection system controller 210 may send PED commands 221 to PED 170 via network gateway 212. PED commands 221 may be configured to cause PED 170 to display the results of a component inspection operation performed by system 200. Stated differently, in various embodiments, inspection system controller 210 may command PED 170 to display information configured to convey to an operator the damage classification for one or more components of cargo handling system 100. For example, PED command 221 may cause PED display 176 to output a report conveying a health, a maintenance status, a maintenance recommendation, etc. for components of cargo handling system 100. The report is configured to convey to the operator of PED 170 the identity and/or location of any component classified as damaged and/or that may be in need of immediate repair, the identity and/or location any component classified as deteriorated and/or which may need to be scheduled for repair, and/or the location any anomaly detected in the cargo deck 12 which may need to be investigated.

PED 170 may be configured to display the results of the report—e.g., the result of the component inspection operation—using segmented and labelled images of the components based on zonal classification to facilitate quicker manual inspection of components that may be damaged. For example, the report may identify the damaged or deteriorated component using a component location 160 (FIG. 2), by displaying a cargo deck map on PED display 176 with the damaged or deteriorated component highlighted in the cargo deck map, and/or by including an image of the damaged or deteriorated component captured by the camera 202 during the component inspection operation. The report displayed on PED 170 is thus configured to allow the maintenance personnel to quickly locate the subject component within the cargo deck 12 so that a manual inspection or immediate maintenance—e.g., removing a foreign object, replacing a component, etc.—may be performed. In various embodiments, the report may include an image generated by the camera 202 of the damaged or deteriorated component. Displaying the image of the component on PED 170 may allow an operator to determine, based on the image, whether immediate action and/or maintenance is needed—e.g., prior to performing of a new loading event—or if maintenance should be scheduled—e.g., loading events may still be performed.

Inspection system controller 210 is configured to combine the image data 215 from each of the cameras 202 and generate an image map of the entire cargo handling system 10. Inspection system controller 210 may be configured to evaluate a quality of the images captured by cameras 202 and/or a completeness of the image map generated from the combined image data output by cameras 202. For example, if an image of insufficient quality to perform the component identification and/or damage classification, as described below, is output by a camera 202 and/or if additional images of a particular location or component are needed to identify the component and/or perform the damage classification, inspection system controller 210 may command PED 170 to display an interactive guidance configured to allow the PED operator to control cameras 202 such that new, or additional, image data of the location and/or the component is generated. The image quality may be evaluated by comparing the current (or real-time) image data 215 to image data received during previous component inspection operations and/or to other image data stored in image classification database 230.

If inspection system controller 210 determines additional and/or better quality images are needed, —e.g., if the entire cargo deck was not captured, if a component could not be identified in a captured image, and/or if a damage classification could not be made for an identified component—inspection system controller 210 may command PED 170 to display a message and/or image configured to alert the operator that additional images are needed. The message and/or image displayed on PED 170 may include instructions for controlling the cargo handling system 100 and/or the cameras 202 to achieve the needed image data. For example, if inspection system controller 210 determines a clearer image or a closer image of a particular location 160 (FIG. 2) or component is needed, inspection system controller 210 sends a PED command 221 to PED 170 configured to convey to the PED operator which location 206 and/or which component was not captured, which camera 202 should be adjusted, which cargo handling system component should be actuated, and/or what steps should be taken to capture the needed image(s). The operator may then use PED 170 to send camera commands 225, in accordance with the PED commands 221 received from inspection system controller 210, to one or more cameras 202. The camera command 225 may be configured to adjust the viewing angle of the camera—e.g., to rotate the camera 202—and/or to cause the camera 202 to zoom-in or zoom-out. PED 170 may also send commands 171, in accordance with the PED commands 221 received from inspection system controller 210, to system controller 130. The commands 171 sent to system controller 130 are configured to cause actuation of one or more components of cargo handling system 100. For example, in response to receiving a component command 219, system controller 130 may send an actuation command 133, as described above, to one or more PDUs 110 and/or an actuation command 135, as described above, to one or more restraints 114.

In accordance with various embodiments, PED 170 is configured to access to the image data 215 output by cameras 202 as well as the results of the component inspection operation. Stated differently, an operator can access and view to the images captured by cameras 202 as well as the results of the component inspection performed by inspection system controller 210 using PED 170. Upon classifying a component as damaged, inspection system controller 210 may command PED 170 to display the image of the damaged component and/or other indicators of the location and identity of component that is damaged, thereby alerting the operator of PED 170—e.g., maintenance personnel—to the issue. Using PED 170, the operator may send camera commands 225 to a camera 202. The camera commands 225 may be configured, for example, to cause the cameras 202 to zoom-in on the damaged component for further inspection and/or to determine if immediate maintenance is needed. If additional views of an actuatable component—e.g., a PDU 110, drive roller 108, or retractable restraint 114—are needed, the operator may use PED 170 to send commands 171 to the system controller 130 for movement and speed control of the actuatable component during the image capture process to get additional images and information—e.g., to obtain images of PDUs 110 in the elevated position and the lowered position, to obtain a 360° view of drive rollers 108, and/or to obtain images of the restraints 114 in the raised position and the stowed position.

In various embodiments, an operator may use PED 170 to initiate a component inspection operation. For example, prior to a loading event and/or after an unloading event, a "begin component inspection operation" command 223 may be sent from PED 170 to inspection system controller 210. In response to receiving the begin component inspection operation command 223, inspection system controller 210 may send a camera command 217 to cameras 202, thereby causing cameras 202 to begin capturing and outputting image data 215. In response to sending the begin component inspection operation command 223, PED 170 may also begin sending commands 171 to control the position of PDUs 110 and/or of restraints 114 and/or to control the rotational speed of the drive rollers 108.

In various embodiments, PED 170 may receive a weight on wheels (WOW) signal 227 and/or other signal—e.g., a parking brake signal—indicating the aircraft is on the ground and that it is safe to perform a loading or unloading operation. PED 170 may be configured such that the commands 171 may only be sent when the WOW signal indicates the aircraft is on the ground. Similarly, system controller 130 may also include logic to detect WOW and/or that the aircraft is on ground. System controller 130 may be configured to only send actuation commands 133, 135, when the aircraft is on the ground. In this regard, PED 170 and/or system controller 130 are configured to prevent or reduce occurrences of a restraint 114 or a PDU 110 being unintentionally actuated during flight.

In accordance with various embodiments, image classification database 230 comprises one or more trained classification model(s), such as trained component identification model 232 and trained damage classification models 234. Trained component identification model 232 and trained damage classification models 234 may be of a machine learning configuration (e.g., an SVM), or may be of a deep learning structure or configuration—e.g., a RNN, a feed-forward neural network; a CNN. The trained component identification model 232 is trained to identify components of cargo handling system 100—e.g., trays 104, rollers 106, PDUs 110, drive rollers 108, restraints 114, roller ball units 120, roller balls 122, etc.—in the image data 215 output by cameras 202. For example, trained component identification model 232 receives image data 215 and outputs a component identification (or component classification) 242.

Trained damage classification models 234 may include a plurality of trained classification models configured to classify a damage/health status of the identified component using on the image data 215 output from cameras 202. Inspection system controller 210 may select to which damage classification model 234 to send the image data 215 based on the component identification 242 output from trained component identification model 232. Inspection system controller 210 may send a damage classification model selection 243 configured to cause the image data 215 to be input into the trained damage classification model 234 that corresponds to the component identification 242. For example, image data 215 may be input into a first trained damage classification model 234 if the trained component identification model 232 classifies the component in the image data 215 as a PDU. Image data 215 may be input into a different trained damage classification model 234 in response to the trained component identification model 232 identifying the component in the image data 215 as a tray 104.

The selected trained damage classification model 234 receives the image data 215 and outputs a damage classification 244. For example, the trained damage classification model 234 may classify the identified component as normal (pass) or damaged (fail). A component that exhibits no detectable damage may be classified as a pass. A component may be classified as a fail if damage which can impact aircraft safety, damage cargo, and/or impact the health of the cargo handling system component is detected. In this regards, a fail may employed to indicate to an operator that the damaged component should be inspected to determine if immediate maintenance is needed or if maintenance can be scheduled at a later date—i.e., to determine if a loading event can be performed safely without remedying the detected damage.

As described above, PED 170 is configured to display and/or report the results of damage classification. In response to PED 170 alerting that a component has received a failed classification, the PED operator may use the PED 170 to interact with system controller 130 and/or to control cameras 202 to view the damaged component. For example, if the operator wishes to inspect the failed component using PED 170, the operator may send a camera command 225 to the camera 202 to power on, rotate, and/or zoom-in on the failed component. The operator may make a more informed decision regarding whether to physically inspect and/or repair the failed component based on the images provided from the camera 202.

In various embodiments, the trained damage classification model 234 may classify the identified component as normal, damaged, deteriorated, or anomaly. In various embodiment, a normal classification may be employed to indicate the component is in proper working condition and/or that no damage has been detected. A damaged classification may be employed to indicate that immediate maintenance and/or inspection is needed—e.g., the cargo handling system may not operate safely or effectively if the detected damage is not corrected. For example, a PDU 110 which is not elevating and/or a drive roller not rotating may cause movement of cargo to stall and may be classified as damaged. Similarly, a bent tray 104 extending above the conveyance plane 102 and which may contact or impede movement of cargo may be classified as damaged. In this regard, scenarios which may warrant correcting before cargo handling system 100 can be operated safely may be classified as damaged.

A deteriorated classification may be employed to indicate that attention may be needed—e.g., the cargo handling system may operate safely, but that component maintenance or replacement may need to be scheduled. For example, a worn drive roller 108 may have an effect on the conveyance of the cargo, but immediate repair is generally not needed to operate the cargo handling system 100 safely and effectively. An anomaly classification may be employed to indicate a foreign object, which may affect component performance has been detected. It is contemplated and understood that the classification of normal, damaged, deteriorated, and anomaly are exemplary, and any number of damage classification categories may be employed.

In accordance with various embodiments, representative images of cargo system components and cargo deck features may be used to train the trained component identification model 232 and the trained damage classification models 234. For example, a number of images may be used to train/define the trained component identification model 232 and trained damage classification model 234, and each of the images will be labeled based upon the associated component and based on the associated heath status of the component—e.g., damaged, deteriorated, normal, abnormal, etc.—(commonly referred to as "supervised learning"). To train the trained component identification model 232 and the trained damage classification models 234, multiple images of components in the normal, deteriorated, damaged, and abnormal state are captured to generate sufficient classification data for the training. For example, to generate normal state component classification data, images of the various cargo handling system components are captured with the components in a non-damaged, non-deteriorated, and non-abnormal state. To generate the deteriorated state, the damaged state, and the abnormal state classification data, the normal state components are replaced with components in a deteriorated state, with components in a damaged state, and with components in an abnormal state—e.g., with a foreign object located on, in, or in a location that will affect the component. Multiple scenarios for the normal state, damaged state, deteriorated state, abnormal state, etc. are generated using images generated and output by cameras 202. In various embodiments, these "real" training images—e.g., imaged generated by cameras in the cargo deck—may be supplemented with synthetic data generated using algorithms (e.g., Generative Adversarial Networks (GAN) techniques). Employing GAN and/or computer generated images to supplement the model training increases the number of conditions that may be identified and/or classified, which tends to increase damage detection accuracy.

Figure 4:
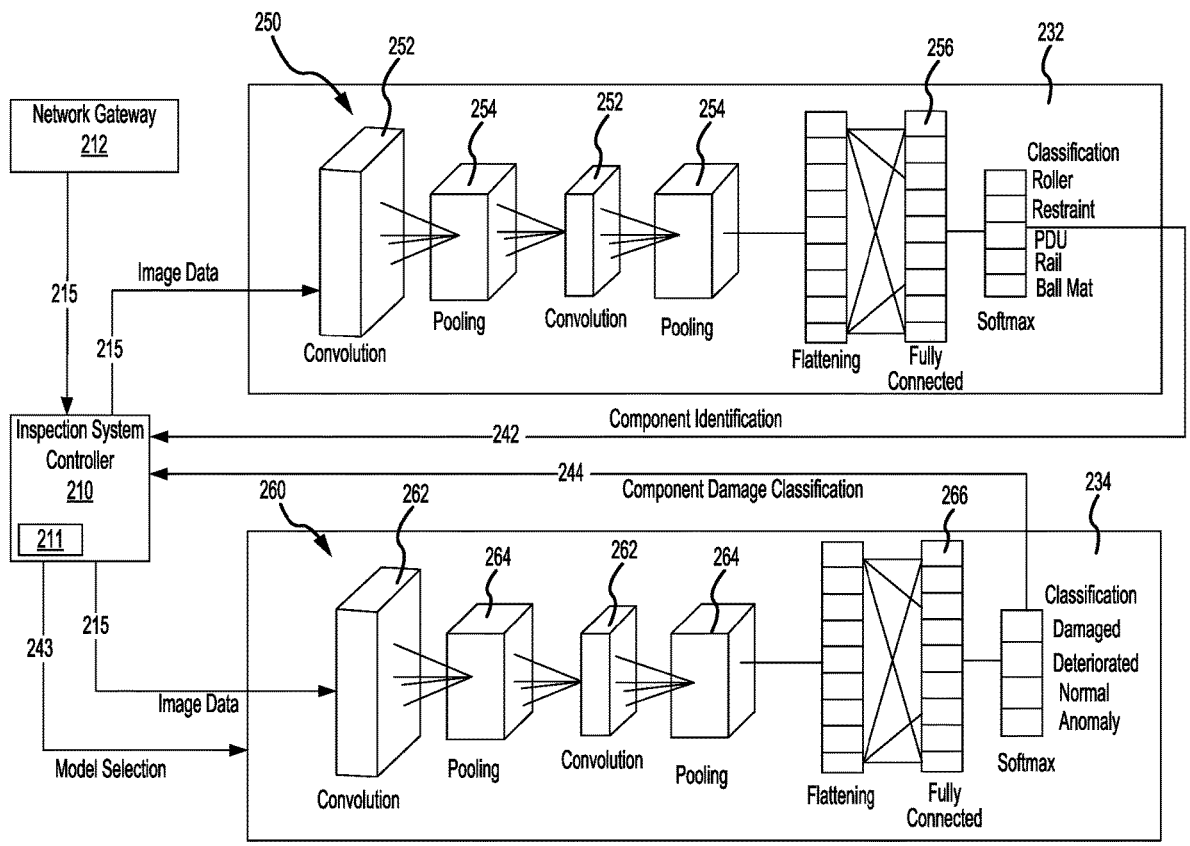
FIG. 4 illustrates a schematic of convolutional neural networks configured for cargo handling system component identification and damage classification, in accordance with various embodiments.

With additional reference to FIG. 4, addition details of a trained component identification model 232 and a trained damage classification model 234 are illustrated. In various embodiments, trained component identification model 232 may comprise a CNN 250 (or similar analytics modules) and the trained damage classification models 234 (one shown) may comprise a CNN 260 (or similar analytics modules). In various embodiments, each of the trained damage classification models 234 may comprise a CNN similar to CNN 260.

Image data 215 is input into CNN 250. The image data 215 is processed in the layers of the CNN 250. In the last layer of the CNN 250, the image data is classified into a particular component category. CNN 250 generally utilizes three types of layers—convolutional, pooling, and a fully-connected layer. Each layer of the CNN 250 may perform a different function—e.g., feature extraction, flattening of the image, etc.). For example, in the convolutional layer 252, a filter may be applied to the input data—e.g., the image data 215 received from one of the cameras 202—to create a feature map that summarizes the various features that were detected in the input data. The output from the convolutional layer 252 may be transmitted to a pooling layer 254 for reduction of the size of the feature map. The convolutional and pooling processes may be repeated, as required. Stated differently, the CNN 250 may include any number of convolution and pooling layers 252, 254 (sometimes referred to as "hidden layers"). The resulting feature map is transmitted to the fully-connected layer 256 for comparison of probability of features existing in conjunction with others to identify/classify the cargo handling system component in the image. The component identification 242 is received by inspection system controller 210.

In various embodiments, CNN 250 and/or inspection system controller 210 may employ algorithms to calculate a confidence score for the component identification 242. Component identifications 242 having a high confidence score—e.g., a confidence score greater than or equal to an ID confidence threshold—may be used by inspection system controller 210 to generate the damage classification model selection 243. Component identifications 242 having a low confidence—e.g., a score less than the ID confidence threshold—may cause inspection system controller 210 to obtain additional image data 215 to try an increase the confidence score. For example, with combined reference to FIG. 4 and FIG. 3B, if inspection system controller 210 determines the confidence score associated with component identification 242 is less than the ID confidence threshold, inspection system controller 210 may send camera commands 217 to the camera 202 that output the data. The camera commands 217 may cause the camera to rotate, zoom-in, and/or zoom-out the camera 202. The image data 215 produced in response to the camera commands 217 is then input into CNN 250. If a sufficient confidence score cannot be achieved, inspection system controller 210 may command PED 170 to display an alert to the PED operator. The alert may convey to the PED operator that a particular location—e.g., a location 206 in FIG. 2—or component within a location 206 (FIG. 2) did not undergo damage classification and/or that manual inspection of the location or components associated with the low confidence score is needed.

Inspection system controller 210 selects into which CNN 260—i.e., which trained damage classification model 234—image data 215 is input based on the component identification 242 output by CNN 250. Image data 215 is input into the selected CNN 260. The image data 215 is processed in the layers of the selected CNN 260. In the last layer of the selected CNN 260, the image data is classified into a particular damage category—e.g., pass, fail, normal, damaged, deteriorated, abnormal, etc. CNN 260 generally utilizes three types of layers—convolutional, pooling, and a fully-connected layer. Each layer of the CNN 260 may perform a different function—e.g., feature extraction, flattening of the image, etc. For example, in the convolutional layer 262, a filter may be applied to the input data—e.g., the image data 215—to create a feature map that summarizes the various features that were detected in the input data. The output from the convolutional layer 262 may be transmitted to a pooling layer 264 for reduction of the size of the feature map. The convolutional and pooling processes may be repeated, as required. Stated differently, the CNN 260 may include any number of convolution and pooling layers 262, 264. The resulting feature map is transmitted to the fully-connected layer 266 for comparison of probability of features existing in conjunction with others to classify the component damage. The damage classification 244 is output to inspection system controller 210.

In various embodiments, CNN 260 and/or inspection system controller 210 may employ algorithms to calculate a confidence of score for the damage classification. Classifications having a high confidence score—e.g., a score greater than or equal to a damage confidence threshold—may be immediately provided as feedback on PED 170. Classifications having a lower confidence—e.g., a score less than the damage confidence threshold—may cause inspection system controller 210 to obtain additional image data. For example, if inspection system controller 210 determines the confidence score associated with damage classification 244 is less than the damage confidence threshold, inspection system controller 210 may cause the camera 202 that produced the image data 215 to rotate, zoom-in, and/or zoom-out. Inspection system controller 210 may cause the camera 202 to rotate by sending camera commands 217 directly to the camera or by sending PED commands 221 to PED 170 to cause the operator to further zoom in or zoom out the associated camera 202. In various embodiments, in the damage classification phase, if damage or deterioration is identified, the image data 215 may be analyzed further using region of interest principals and additional instructions may be sent, by inspection system controller 210, to PED 170 to cause the operator to further zoom-in or zoom-out the associated camera 202 to capture images of the damaged or deteriorated portion of the cargo component, thereby generating additional image data to confirm the damage classification of the component.

Inspection system controller 210 may store the images data 215 and results/damage classifications generated during each component inspection operation in storage medium 211 or any other memory accessible to inspection system controller 210. In this regard, the image data and results may be accessed by maintenance personnel and other stake holders at any time.

While trained component identification model 232 and trained damage classification models 234 are illustrated and described in FIG. 4 as CNNs, it is contemplated and understood that trained component identification model 232 and/or trained damage classification models 234 may be configured as other to employ other types of machine learning or deep neural networks. For example, in various embodiments, trained component identification model 232 and/or trained damage classification models 234 may be include an RNN.

System 200, including trained component identification model 232 and trained damage classification model 234, may increase the reliability, accuracy, and repeatability of damage detection and repair recommendations for cargo handling system 100, as compared to manual inspection, which is prone to variation and subjective decision made by the human inspector. Additionally, the effort and skill associated with an operator of system 200 is less than is needed for a manual inspector. Image data captured by cameras 202 supports identification of defects, anomalies, dents, creases, and/or bends, which may not be readily perceivable by human eyes. The image classification database can be trained to detect any number of situations, for example, paint or coating defects, which may be neglected by human inspection. Identifying and classifying deterioration allows maintenance of the cargo handling system 100 to be scheduled as needed, which tends to reduce occurrences of sudden field failures.

Figure 5A:
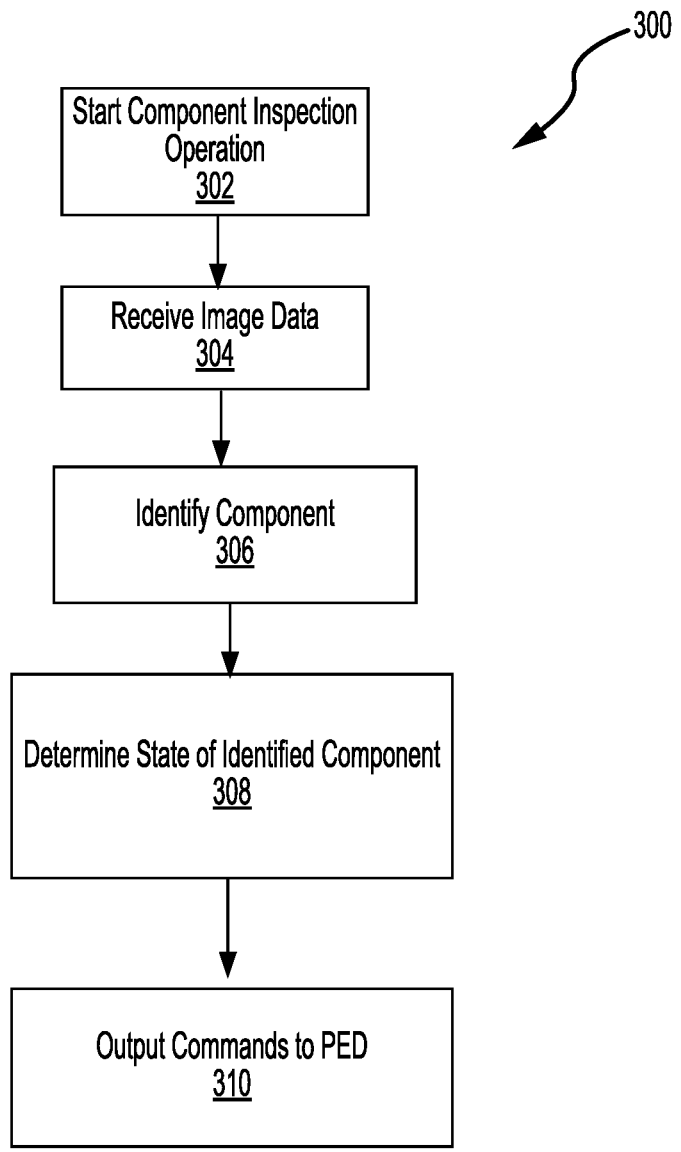
FIGS. 5A and 5B illustrate a method of inspecting components of a cargo handling system, in accordance with various embodiments.

With reference to FIG. 5A, and continuing reference to FIGS. 3A and 3B, a method 300 for inspecting components of a cargo handling system is illustrated. In accordance with various embodiments, method 300 may be performed by component inspection system 200 for inspecting cargo handling system 100. In various embodiments, method 300 includes starting a component inspection operation (step 302). Step 302 may be performed by inspection system controller 210. Step 302 may be performed in response to inspection system controller 210 receiving a begin component inspection operation command 223 from PED 170. Method 300 may further include receiving, by inspection system controller 210, image data 215 from a camera 202 (step 304), identifying, by inspection system controller 210, a component of the cargo handling system 100 in the image data 215 (step 306), and determining, by inspection system controller 210, a state of the component (step 308). In various embodiments, the state of the component comprises at least one of a normal state or a damaged state. In various embodiments, method 300 may further include outputting, by inspection system controller 210, PED commands 221 to PED 170 (step 310). In various embodiments, step 310 may include commanding, by inspection system controller 210, PED 170 to display the state of the component.

Figure 5B:
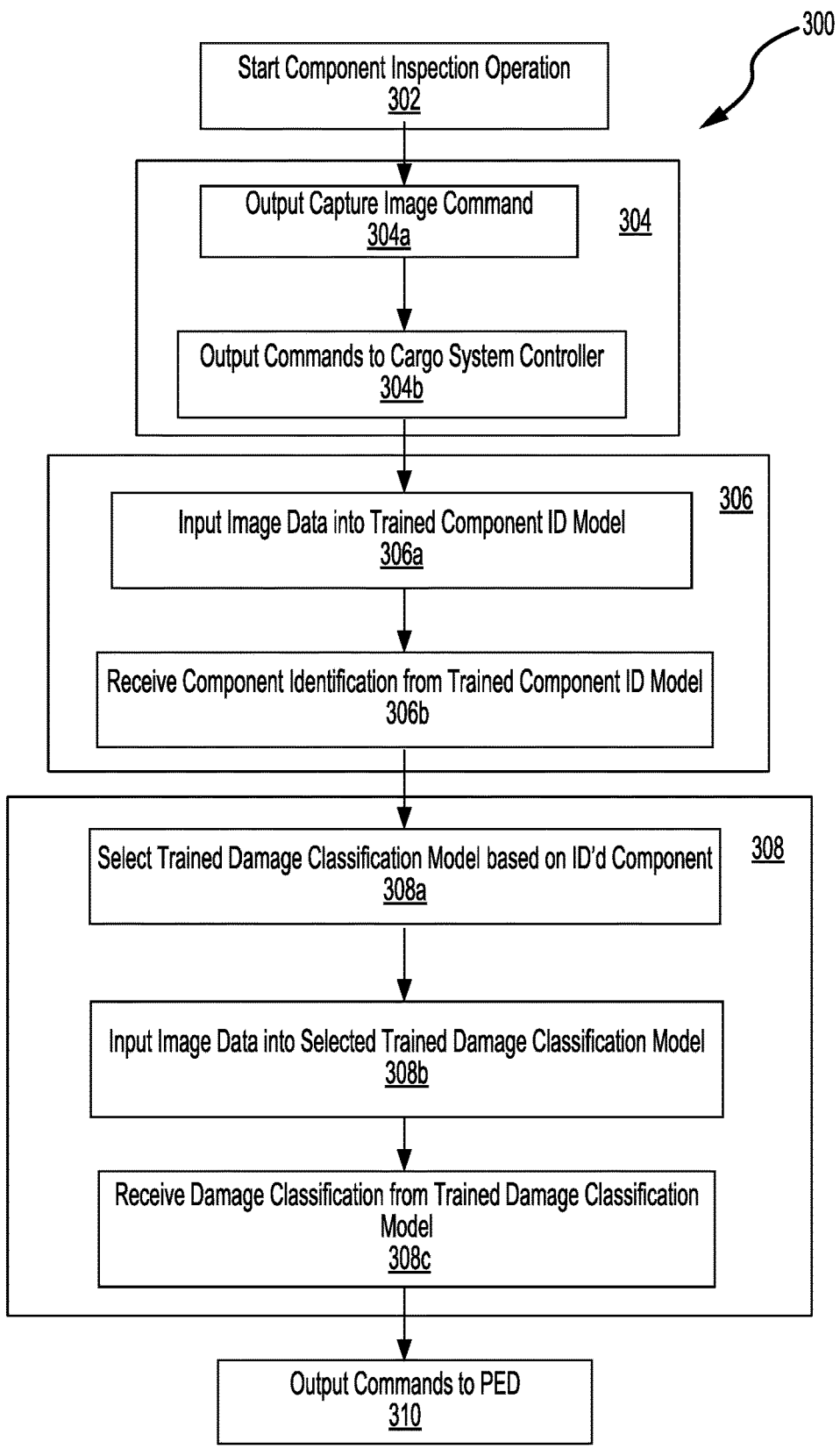

With additional reference to FIG. 5B, in various embodiments, step 304 may include inspection system controller 210 commanding the cameras 202 to begin capturing image data 215 and outputting the image data 215 to inspection system controller 210 (step 304a). In various embodiments, step 304 may include inspection system controller 210 commanding system controller 130 to send actuation commands to one or more components of the cargo handling system 100 (step 304b).

In various embodiments, step 306 may include inputting, by inspection system controller 210, the image data 215 into trained component identification model 232 (step 306a) and receiving, by inspection system controller 210, a component identification 242 output by trained component identification model 232 (step 306b). Trained component identification model 232 may identify the component in the image data 215 using a CNN.

In various embodiments, step 308 may include selecting, by inspection system controller 210, a trained damage classification model 234 based on the component identification 242 output by the trained component identification model 232 (step 308a), inputting, by inspection system controller 210, the image data 215 into the (selected) trained damage classification model (step 308b), and receiving, by inspection system controller 210, a damage classification 244 output by the selected trained damage classification model 234 (step 308c), where the damage classification is the state of the component. In various embodiments, the state of the component comprises at least one of a normal state or a damaged state. In various embodiments, the state of the component may comprise at least one of a normal state, a damaged state, a deteriorated state, or an anomaly state. Trained damage classification model 234 may classify the state of the component using a CNN.

In various embodiments, method 300 may further include determining a confidence score of the damage classification and comparing the confidence score to a threshold confidence. In various embodiments, method 300 may further including inspection system controller 210 commanding the camera 202 to at least one of rotate, zoom-in, or zoom-out in response to determining the confidence score to is less than the threshold confidence. In various embodiments, the rotate, zoom-in, or zoom-out of the camera may be achieved by inspection system controller 210 commanding PED 170 to display instructions configured to convey that the camera 202 should be rotated, zoomed-in, or zoomed-out.

In various embodiments, step 310 may include commanding PED 170 to display the image data 215 output by the camera 202. In various embodiments, step 310 may include commanding PED 170 to display an interactive guidance configured to allow at least one of the camera or a component of the cargo handling system 100 to be controlled using the PED 170.

Figure 6:
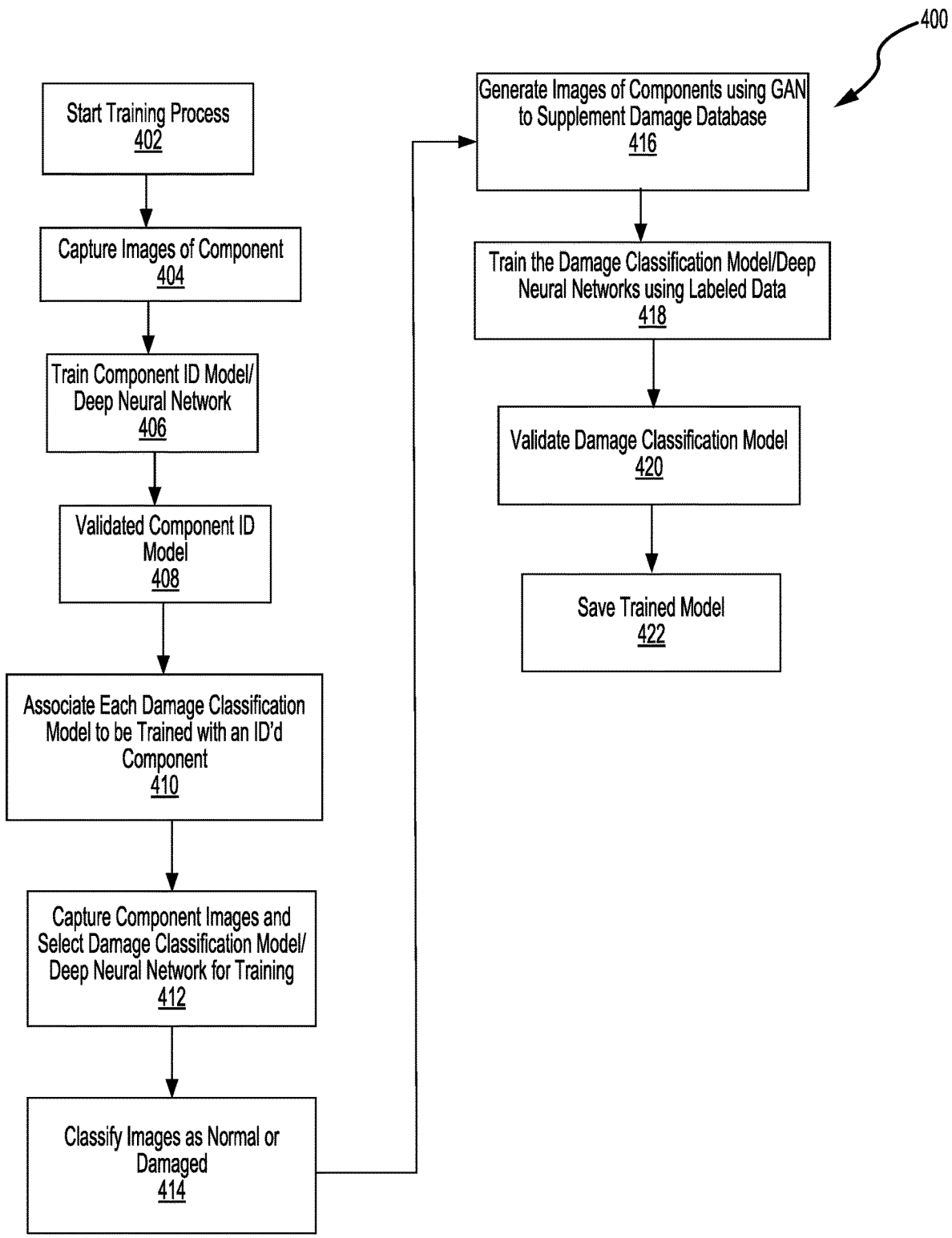
FIG. 6 illustrates a method of training an image classification model for inspecting components of a cargo handling system, in accordance with various embodiments.

With reference to FIG. 6, a method 400 for training a component identification model and damage classification models for a component inspection system, such as system 200 described above, is illustrated. The steps of method 400 may be performed to train trained component identification model 232 and trained damage classification models 234, as described above with reference to system 200. Method 400 may begin by initiating a model training operation (step 402). Method 400 may further include capturing images of cargo handling system components—e.g., trays 104, rollers 106, PDUs 110, drive rollers 108, restraints 114, roller ball units 120, etc.—(step 404). The captured images are then categorized, assigned, or labeled with a component identification to train the trained component identification model (step 406). A validation test of the trained component identification model is performed (step 408). If the trained component identification model passes the validation test, step 410 is performed. If the trained component identification model does not pass the validation test, additional image captures and image classifications are performed—i.e., steps 404 and 406 are repeated—until the validation test is passed.

Method 400 may further include associating a damage classification model to be trained for damage classification with each component identification output by the trained component identification model—e.g., associating a PDU damage classification model with images classified as PDUs, associating a restraint damage classification model with images classified as restraints, associating a tray damage classification model with images classified as trays, etc. (step 410).

Method 400 may further include capturing images of cargo handling system components using cameras located in the cargo deck—e.g. cameras 202—and selecting the damage classification model corresponding to the captured images for training (step 412) and classifying the images (step 414). In various embodiments, step 414 may include classifying the images as one of normal or damaged. In various embodiments, step 414 may include classifying the images as one of normal, damaged, deteriorated, and anomaly.

In various embodiments, method 400 may further include generating additional images of the cargo handling system component using GAN to the supplement the damage classification model (step 416).

Method 400 may further include training the damage classification model using labelled data (step 418). A validation test of the trained damage classification model is performed (step 420). If the trained damage classification model passes the validation test, the trained model is saved, and the training process is exited (step 422). If the trained damage classification model does not pass the validation test, additional image captures and image classification is performed—i.e., steps 412, 414, 416, and 418 are repeated—until the validation test is passed. Steps 412, 414,

416, 418, 420 and 422 may be performed for each of trained damage classification model. Stated differently, steps 412, 414, 416, 418, 420 and 422 may be performed to create a trained damage classification model for each component identification/classification employed by the trained component identification model.

Employing a first trained classification model to identify the component and a second trained classification model to classify damage may increase accuracy and a number of damage conditions that may be detected. Similarly, controlling the cargo handling system components during image capture may further increase the accuracy and a number of damage conditions that may be detected.

In various embodiments, components, modules, or engines of the systems or apparatus described herein may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® operating system, and the like. The micro-app may be configured to leverage the resources of a larger operating system and associated hardware via a set of predetermined rules that govern the operation of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system that monitors various hardware components and then communicates a detected input from the hardware to the micro-app.

The system and methods described herein may also be described in terms of functional block components, screen shots, optional selections, and various processing steps. It should be appreciated that such functional blocks may be realized by any number of hardware or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® Active Server Pages, assembly, PERL®, PHP, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like.

The various system components discussed herein may also include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

As used herein, the term "network" includes any cloud, cloud computing system, or electronic communications system or method that incorporates hardware or software components. Communication among the components of the systems may be accomplished through any suitable communication channels, such as, for example, a telephone network, an extranet, an intranet, or an internet. Such communications may also occur using online communications, satellite communications, off-line communications, wireless communications, transponder communications, local area network (LAN), wide area network (WAN), or virtual private network (VPN). Moreover, the systems may be implemented with TCP/IP communications protocols, IPX, APPLETALK®, IP-6, NetBIOS, OSI, any tunneling protocol (e.g., IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re *Nuijten* to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A component inspection system for monitoring and detecting damage to components of a cargo handling system, the component inspection system comprising:

a first camera configured to monitor a first detection zone; and an inspection system controller configured to analyze image data output by the first camera, wherein the inspection system controller is configured to:
   identify a component of the cargo handling system in the image data received from the first camera, wherein the inspection system controller is configured to identify the component of the cargo handling system in the image data by:
      inputting the image data into a trained component identification model; and
      receiving a component identification output by the trained component identification model;
   determine a state of the component, the state of the component comprising at least one of a normal state or a damaged state, wherein the inspection system controller is configured to determine the state of the component by:
      selecting a trained damage classification model based on the component identification output by the trained component identification model;
      inputting the image data into the trained damage classification model; and
      receiving a damage classification output by the trained damage classification model, the damage classification corresponding to the state of the component;
   determine a confidence score of the damage classification;
   comparing the confidence score to a threshold confidence; and
   command the first camera to at least one of rotate, zoom-in, or zoom-out in response to determining the confidence score to is less than the threshold confidence.

2. The component inspection system of claim 1, further comprising a network gateway configured to receive the image data output by the first camera and output a signal corresponding to the image data to the inspection system controller.

3. The component inspection system of claim 1, wherein at least one of the trained component identification model and the trained damage classification model comprises a convolutional neural network.

4. The component inspection system of claim 1, further comprising a portable electronic device in operable communication with the first camera and the inspection system controller.

5. The component inspection system of claim 4, wherein the portable electronic device is configured to send a camera command to the first camera based on the command received from the inspection system controller.

6. The component inspection system of claim 5, wherein the inspection system controller is configured to command the portable electronic device to display a report configured to convey at least one of a component identity and a component location for any component of the cargo handling system determined to be in the damaged state.

7. A method for inspecting components of a cargo handling system, the method comprising:
   receiving, by an inspection system controller, a begin component inspection operation command;
   receiving, by the inspection system controller, image data from a camera configured to capture images of a detection zone;

identifying, by the inspection system controller, a component of the cargo handling system in the image data, wherein identifying, by the inspection system controller, the component of the cargo handling system in the image data comprises:
  inputting, by the inspection system controller, the image data into a trained component identification model; and
  receiving, by the inspection system controller, a component identification output by the trained component identification model;
determining, by the inspection system controller, a state of the component, wherein the state of the component comprises at least one of a normal state or a damaged state, wherein determining, by the inspection system controller, the state of the component comprises:
  selecting, by the inspection system controller, a trained damage classification model based on the component identification output by the trained component identification model;
  inputting, by the inspection system controller, the image data into the trained damage classification model; and
  receiving, by the inspection system controller, a damage classification output by the trained damage classification model, the damage classification corresponding to the state of the component;
determining, by the inspection system controller, a confidence score of the damage classification;
comparing, by the inspection system controller, the confidence score to a threshold confidence; and
commanding, by the inspection system controller, the camera to at least one of rotate, zoom-in, or zoom-out in response to determining the confidence score to is less than the threshold confidence.

8. The method of claim 7, further comprising commanding, by the inspection system controller, a portable electronic device to display the state of the component.

9. The method of claim 8, further comprising commanding, by the inspection system controller, the portable electronic device to display the image data output by the camera.

10. The method of claim 7, further comprising commanding, by the inspection system controller, a portable electronic device to display an interactive guidance configured to allow at least one of the camera or the component to be controlled using the portable electronic device.

11. An article of manufacture including a tangible, non-transitory computer-readable storage medium having instructions stored thereon for performing a cargo handling system component inspection operation and that, in response to execution by an inspection system controller, cause the inspection system controller to perform operations comprising:
  receiving, by the inspection system controller, a begin component inspection operation command;
  receiving, by the inspection system controller, image data from a camera configured to capture images of a cargo handling system;
  identifying, by the inspection system controller, a component of the cargo handling system in the image data, wherein identifying, by the inspection system controller, the component of the cargo handling system in the image data comprises:
    inputting, by the inspection system controller, the image data into a trained component identification model; and
    receiving, by the inspection system controller, a component identification output by the trained component identification model;
  determining, by the inspection system controller, a state of the component, wherein the state of the component comprises at least one of a normal state or a damaged state, wherein determining, by the inspection system controller, the state of the component comprises:
    selecting, by the inspection system controller, a trained damage classification model based on the component identification output by the trained component identification model;
    inputting, by the inspection system controller, the image data into the trained damage classification model; and
    receiving, by the inspection system controller, a damage classification output by the trained damage classification model, the damage classification corresponding to the state of the component; and
  sending, by the inspection system controller, instructions to a portable electronic device configured to cause the portable electronic device to command the camera to at least one of zoom-in or zoom-out and capture image data of a damaged portion of the component.

* * * * *